United States Patent [19]
Tseng

[11] Patent Number: 5,854,483
[45] Date of Patent: Dec. 29, 1998

[54] METHOD AND SYSTEM FOR READING ENCODED OPTICAL SIGNALS AND FORMING SQUARE WAVE SIGNALS THEREFROM

[76] Inventor: Hsin-Te Tseng, 4F, No. 19, Shih Chien St., Peitou, Taipei, Taiwan

[21] Appl. No.: 736,684

[22] Filed: Oct. 25, 1996

[51] Int. Cl.⁶ .................................................. G01D 5/34
[52] U.S. Cl. .............................. 250/231.13; 250/231.14
[58] Field of Search ..................... 250/231.13, 231.14, 250/231.15, 231.16, 231.17, 231.18, 237 G; 356/373, 375; 341/13, 31

[56] References Cited

U.S. PATENT DOCUMENTS 4,507,647  3/1985  Minami et al. ..................... 250/231.14
5,254,919  10/1993  Bridges et al. ..................... 250/231.14

*Primary Examiner*—Edward P. Westin
*Assistant Examiner*—Kevin Pyo
*Attorney, Agent, or Firm*—Rosenberg, Klein & Bilker

[57] ABSTRACT

A method of reading encoded optical signal including the steps of: i) driving a light source to produce a light beam, ii) using a lens to focus the light beam of the light source onto a receiving face of a crystal of a phototransistor by a lens, and iii) chopping off the energy of the light from the light beam which surpasses the rated working voltage of the phototransistor, and disregarding from judgment the potential of the light beam which is below a predetermined critical level, so as to obtain a signal approximately equal to a square wave.

2 Claims, 19 Drawing Sheets

METHOD AND SYSTEM FOR READING ENCODED OPTICAL SIGNALS AND FORMING SQUARE WAVE SIGNALS THEREFROM

BACKGROUND OF THE INVENTION

The present invention relates to a method of reading encoded optical signal by: using a lens to focus the light beam which passes from a light source through a wheel, onto a receiving face of a crystal of a phototransistor, chopping off the energy of the light from the light beam which surpasses the rated working voltage of the phototransistor, and disregarding from judgment the potential of the light beam which is below a predetermined critical level.

FIGS. 1 and 2 show an apparatus for reading encoded optical signal according to the prior art, which is comprised of an optical encoder 80, and a judge circuit 90. The optical encoder 80 comprises a light source 81, a wheel 82 (transparent or grated), a phototransistor 83, and a potential circuit 84. Light from the light source 81 is projected through the wheel 82 onto the light receiving face of the crystal 831 or 831' of the phototransistor 83, causing the phototransistor 83 to convert the light signal into a corresponding electrical signal, and simultaneously to pull the potential to high. The potential signal thus obtained is then transmitted through the potential circuit 84 to the judge circuit 90, so that the judge circuit 90 can read the output signal of the optical encoder 80. The variation of the light beam which falls to the phototransistor 83, is measured when the width of the light beam is smaller than the width of the crystal (see FIG. 3 and 4), in which C, D: the width of the light beam; A, B: the width of the crystal; T1–T4: the time in which the light beam moves. When light beam falls to the receiving face of the crystal, it changes as followings:

1. When the width D of the light beam is moved to T1, the light beam is projected onto ½ of the width A, and the potential of the energy of the light beam is pulled from 0 voltage a1 to level a2;
2. When the width D of the light beam is moved to T2, the light beam is projected onto the whole area of the width A, and the potential of the energy of the light beam is pulled from level a2 to level a3;
3. When the width D of the light beam is moved to T3, the light beam is projected onto ½ of the width A, and the potential of the energy of the light beam is dropped from level a3 to level a4;
4. When the width D of the light beam is moved to T4, the light beam is prohibited from projecting onto the width A, and the potential of the light beam drops from level a4 to level a5.

When a line is drawn to connect all points a1–a5 together, the curve shown in FIG. 4 is obtained. If, the width of the light beam D=the width of the crystal A and the width of the light beam C≧the width of the crystal B, thus the potential points of a1–a5 remain unchanged.

On the contrary, if the width of the light beam C<the width of the crystal B, thus the locations of a2, a3, a4 at the time axis are relatively changed while the locations of a1, a5 at the time axis remain unchanged, as shown is FIG. 5, and the waveform shown in FIG. 6 is obtained.

As indicated above, to obtain the same waveform from the two crystals 831, 831' of the phototransistor 83, the size of the crystals 831, 831' must be equal. As illustrated in FIG. 7, the phases of the crystals are staggered so that the desired waveform is obtained.

However, the aforesaid structure of encoded optical signal reading apparatus is still not satisfactory in function. Because of manufacturing tolerance, a minor difference in size between the crystals of the phototransistor 83 is inevitable. This difference cause the cycle and amplitude of the output signal of the phototransistor 83 to be unstable (because the amplitude of the output signal of the phototransistor 83 is directly proportional to the area of the receiving face of the crystal). Therefore, the judge circuit 90 may make a wrong judgement. In order to eliminate this problem, the optical encoder 80 must be calibrated through a series of tests. However, these complicated tests greatly increases the manufacturing cost of the optical encoder 80. Furthermore, this structure of optical encoder 80 needs much installation space.

SUMMARY OF THE INVENTION

The present invention has been accomplished to provide an encoded optical signal reading method and an optical encoder for such method which eliminate the aforesaid problems. According to the present invention, the encoded optical signal reading method includes the steps of: i) driving a light source to produce a light beam, ii) using a lens to focus the light beam of the light source onto a receiving face of a crystal of a phototransistor by a lens, and iii) chopping off the energy of the light from the light beam which surpasses the rated working voltage of the phototransistor, and disregarding from judgment the potential of the light beam which is below a predetermined critical level, so as to obtain a signal approximately equal to a square wave. The encoder for such encoded optical signal reading method comprises a lens disposed between the wheel and the light receiving face of a corresponding crystal at the phototransistor, so that a square wave digital signal can be obtained by chopping off the energy of the light beam which surpasses the rated working voltage of the phototransistor and disregarding from judgment the potential of the light beam which is below a predetermined critical level.

DETAILED DESCRIPTION OF THE PREFERRED EMBODIMENT

Figure 1:
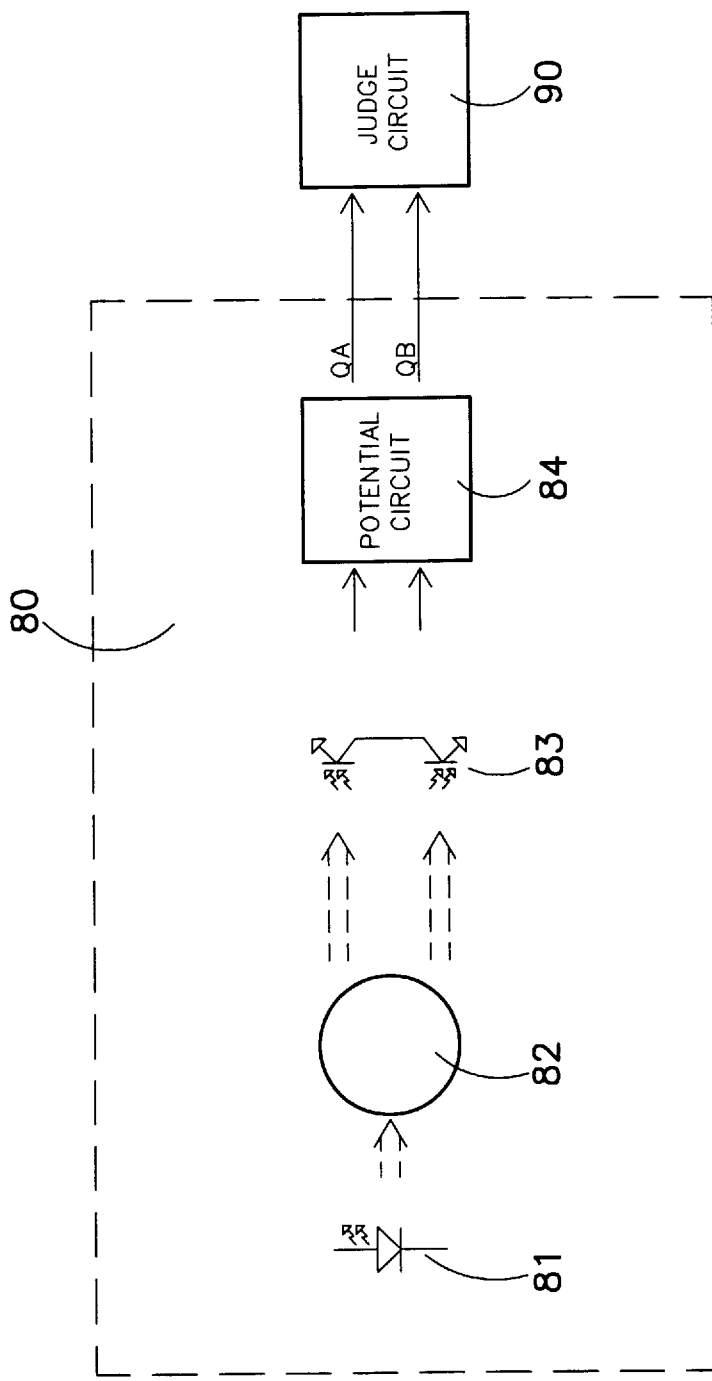
FIG. 1 is a circuit block diagram of an encoded signal reading apparatus according to the prior art.
Figure 2:
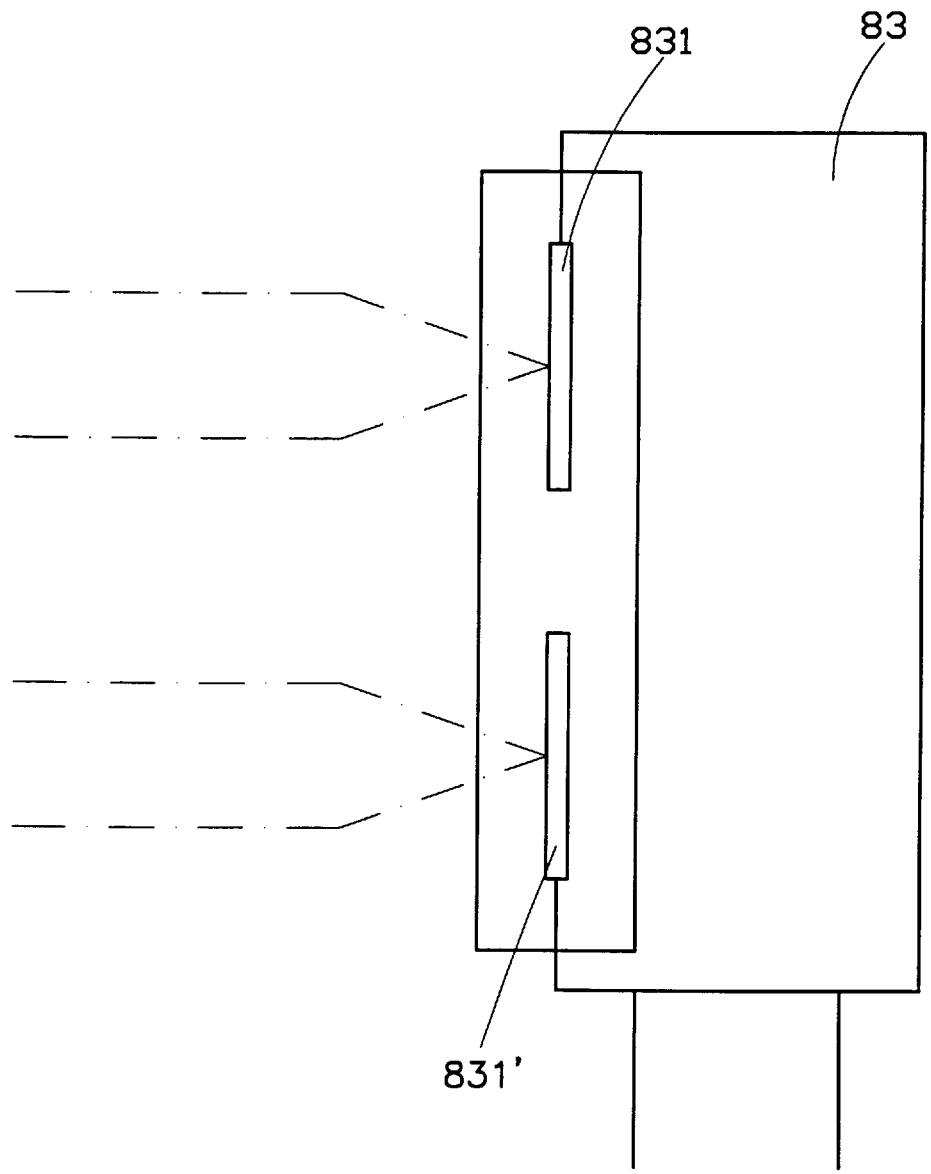
FIG. 2 is a plain view showing the positions of the crystals in the phototransistor of the optical encoder of the encoded signal reading apparatus shown in FIG. 1.
Figure 3:
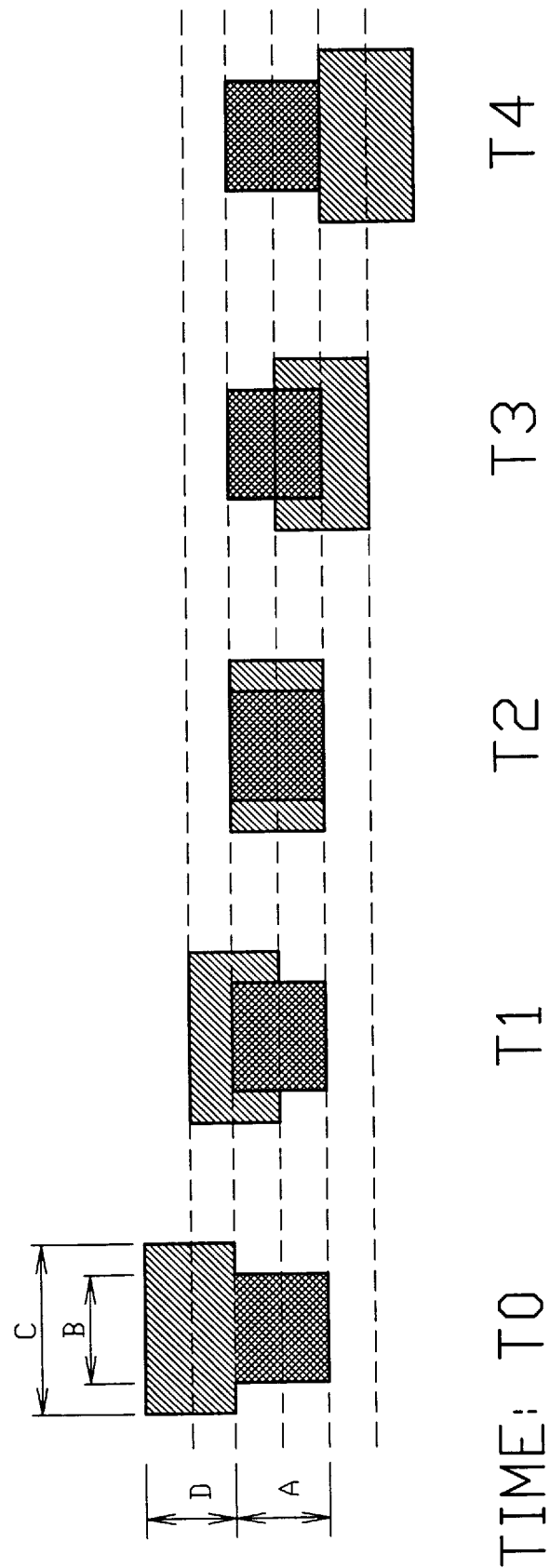
FIG. 3 is a schematic drawing showing one status of the projection of the light beam onto the light receiving faces of the crystals of the phototransistor according to the prior art.
Figure 4:
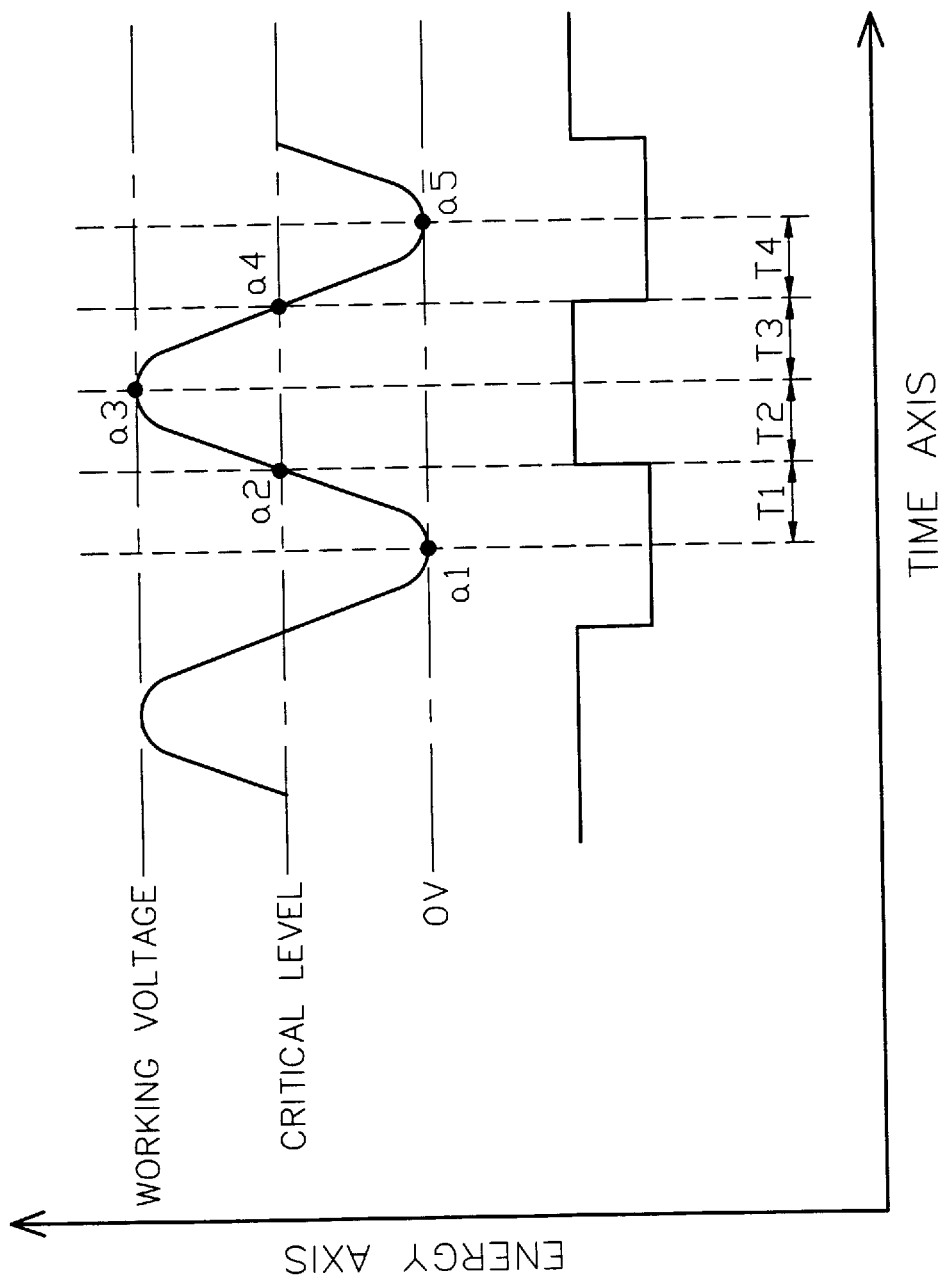
FIG. 4 is a curve showing the waveform of an output of the phototransistor according to the prior art.
Figure 5:
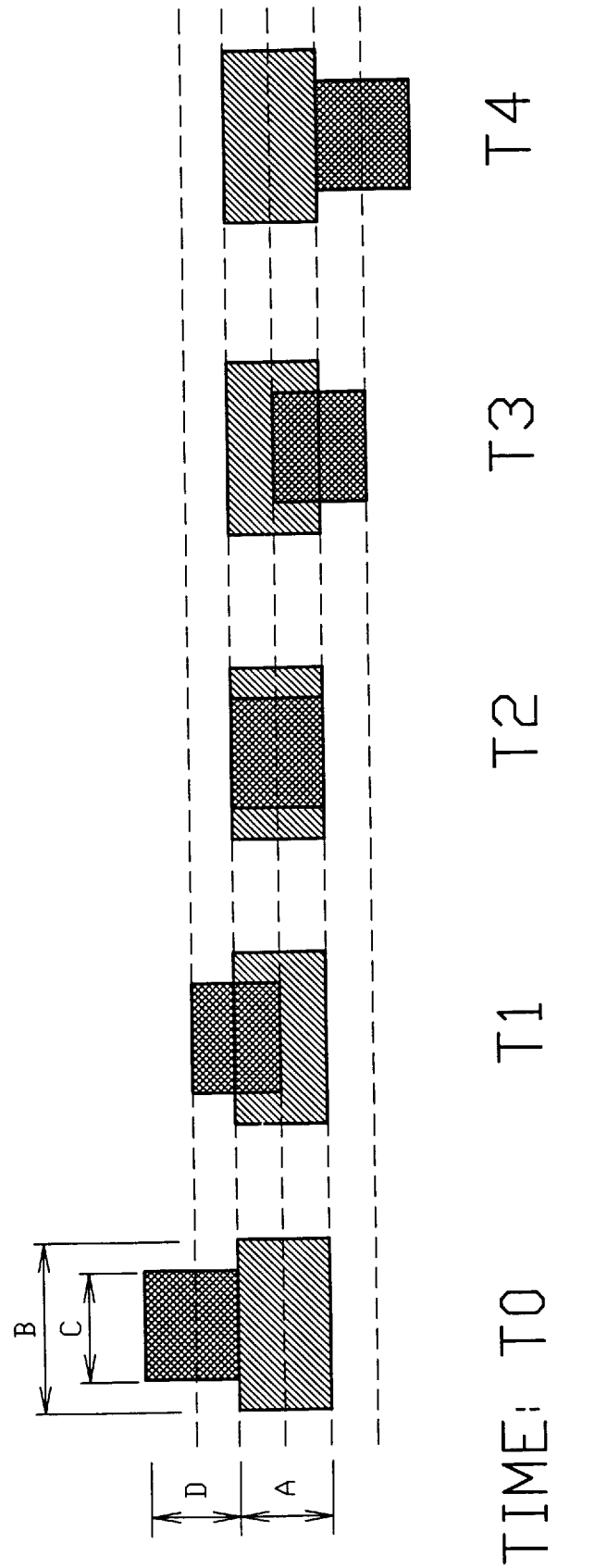
FIG. 5 is a schematic drawing showing another status of the projection of the light beam onto the light receiving faces of the crystals of the phototransistor according to the prior art.
Figure 6:
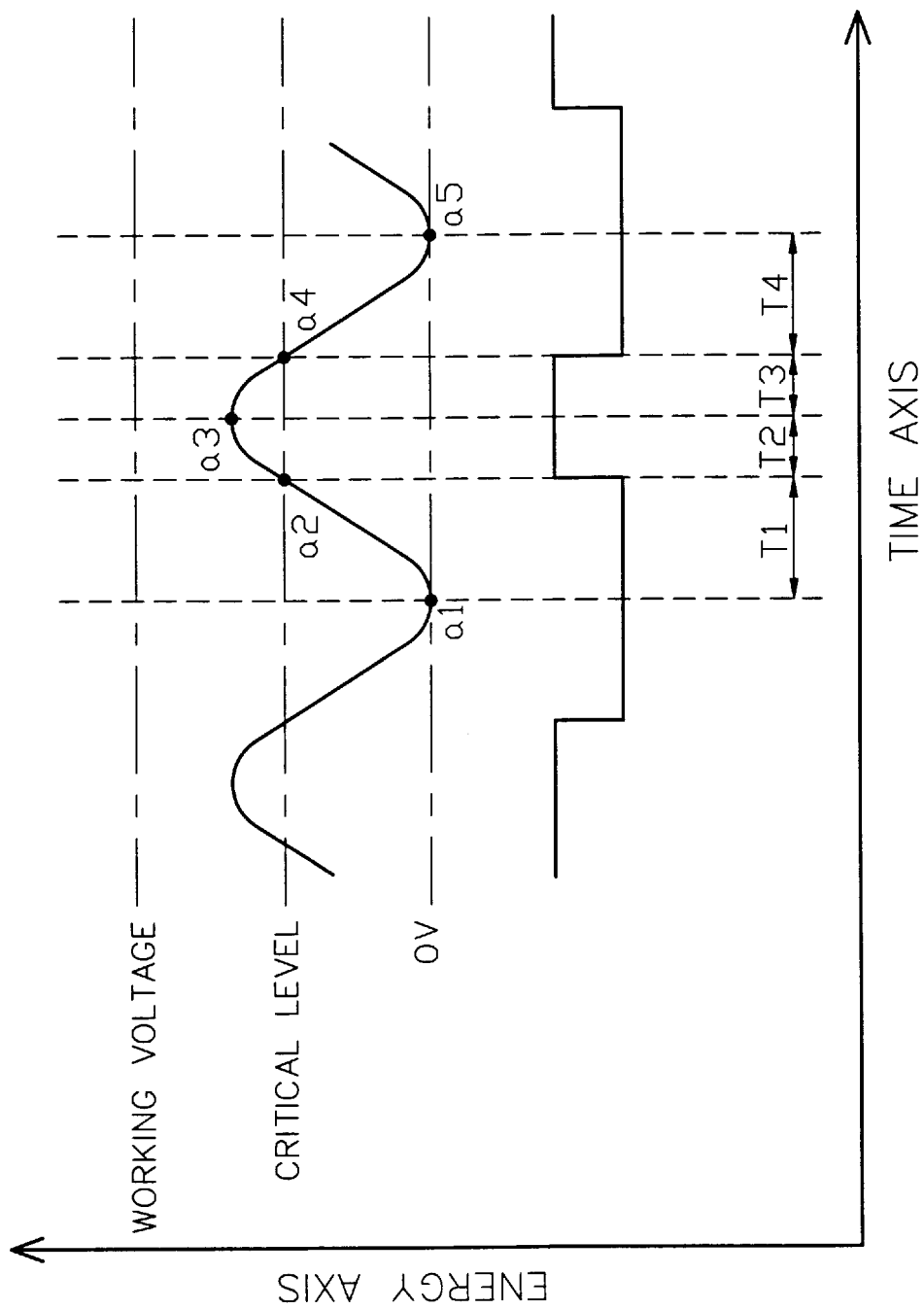
FIG. 6 is a curve showing the waveform of another output of the phototransistor according to the prior art.
Figure 7:
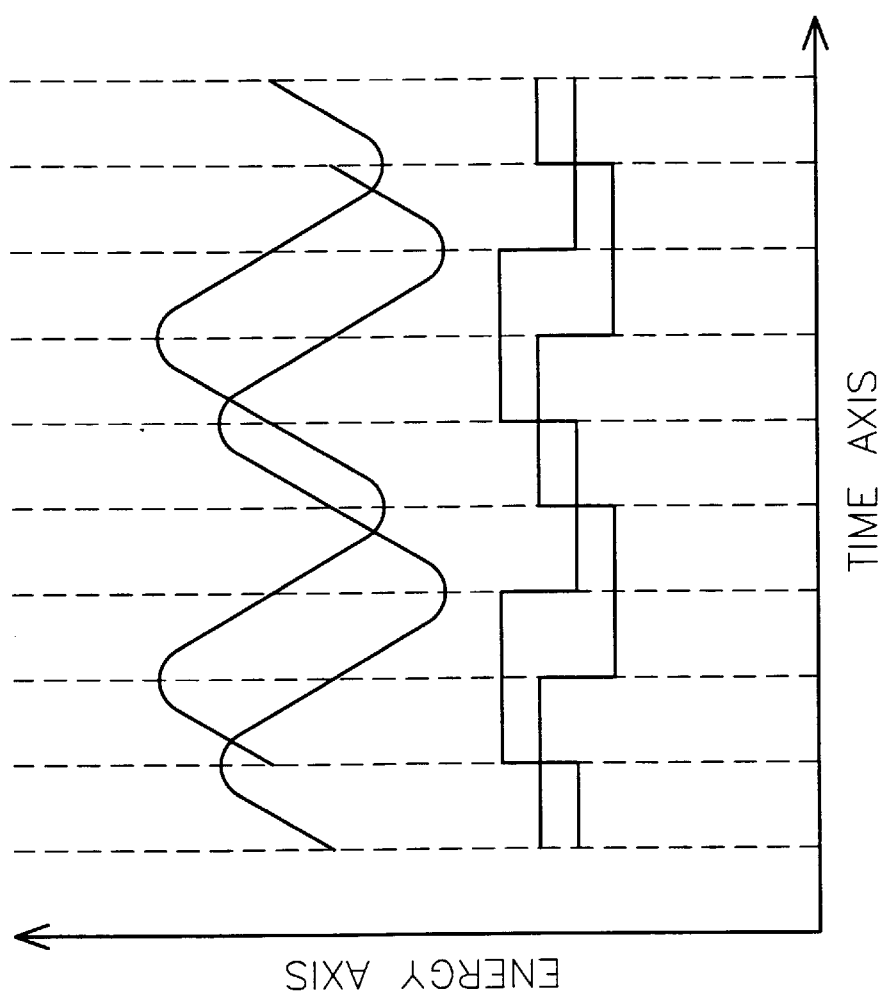
FIG. 7 is a curve showing the waveforms obtained from the two crystals of the phototransistor of the optical encoder of the encoded signal reading apparatus according to the prior art.
Figure 8:
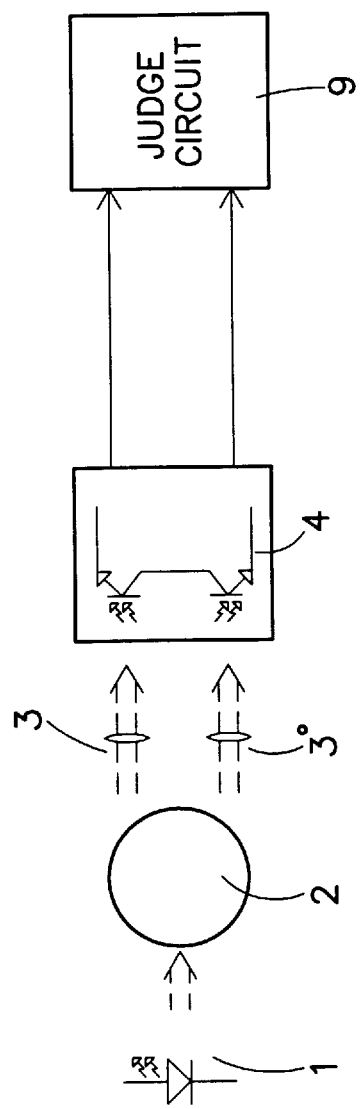
FIG. 8 is a circuit block diagram of an optical encoder according to the present invention.

Referring to FIG. 8, an optical encoder in accordance with the present invention is generally comprised of a light source 1, a wheel 2, a first lens 3, a second lens 3', a phototransistor 4 and a judge circuit 9. The lenses 3, 3' are arranged between the wheel 2 and the phototransistor 4, and packed with the phototransistor 4 in integrity by light shielding material. The wheel 2 can be a transparent or grated wheel. The lenses 3, 3' can be plano-convex lenses or biconvex lenses.

Figure 9:
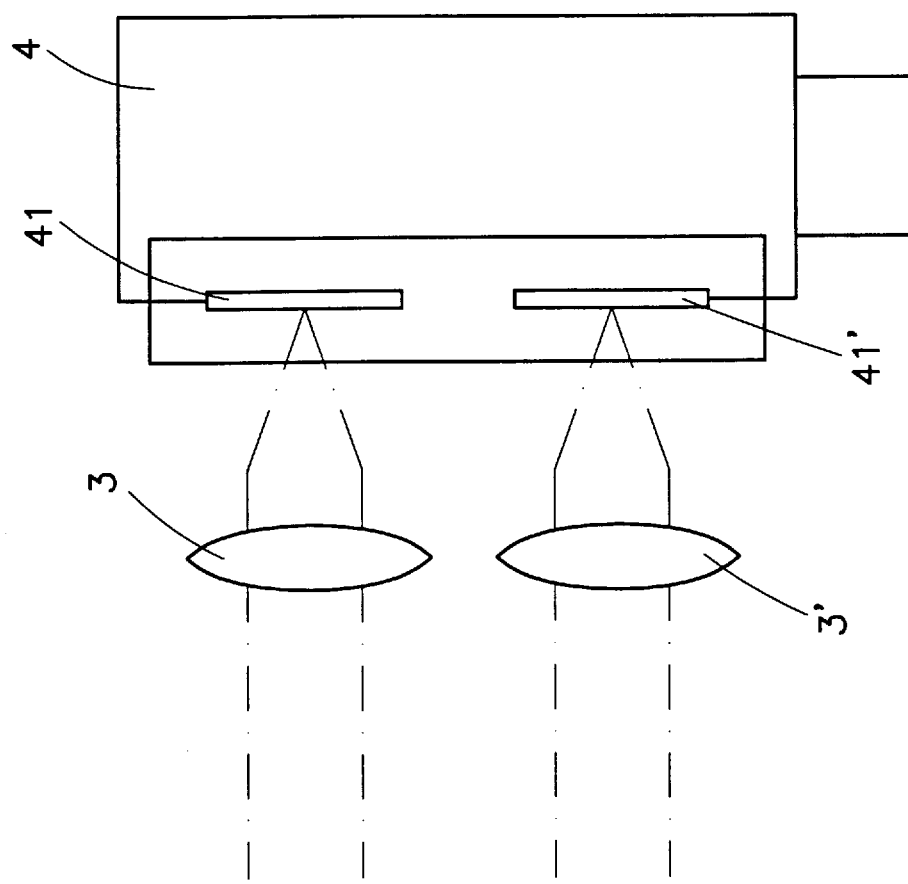
FIG. 9 shows light beams projected onto the crystals of the phototransistor of the optical encoder according to the present invention.
Figure 10:
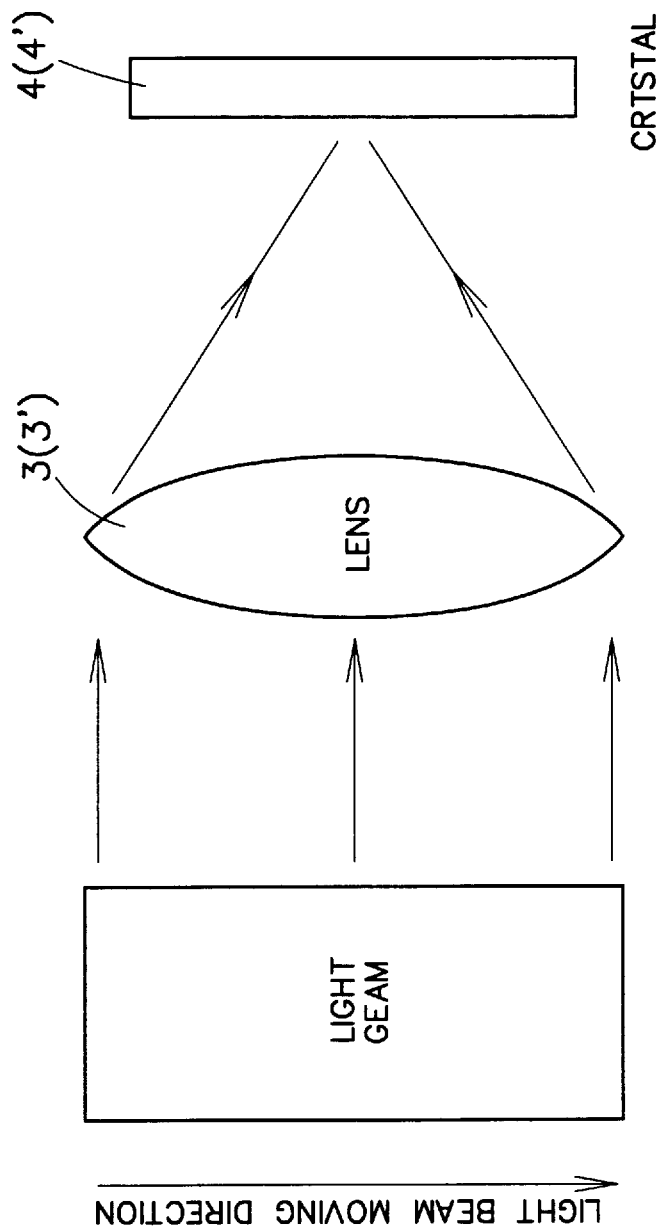
FIG. 10 is a schematic drawing showing a light beam projected onto a crystal through a lens according to the present invention.

Referring to FIGS. 9 and 10, and FIG. 8 again, the wheel 2 encodes the light of the light source 1 into encoded light beam signals of a uniform cycle, and outputs encoded light beam signals toward the phototransistor 4, permitting encoded light beam signals to be focused onto the light receiving faces of the crystals 41, 41' of the phototransistor 4 by the lenses 3, 3'.

Figure 11:
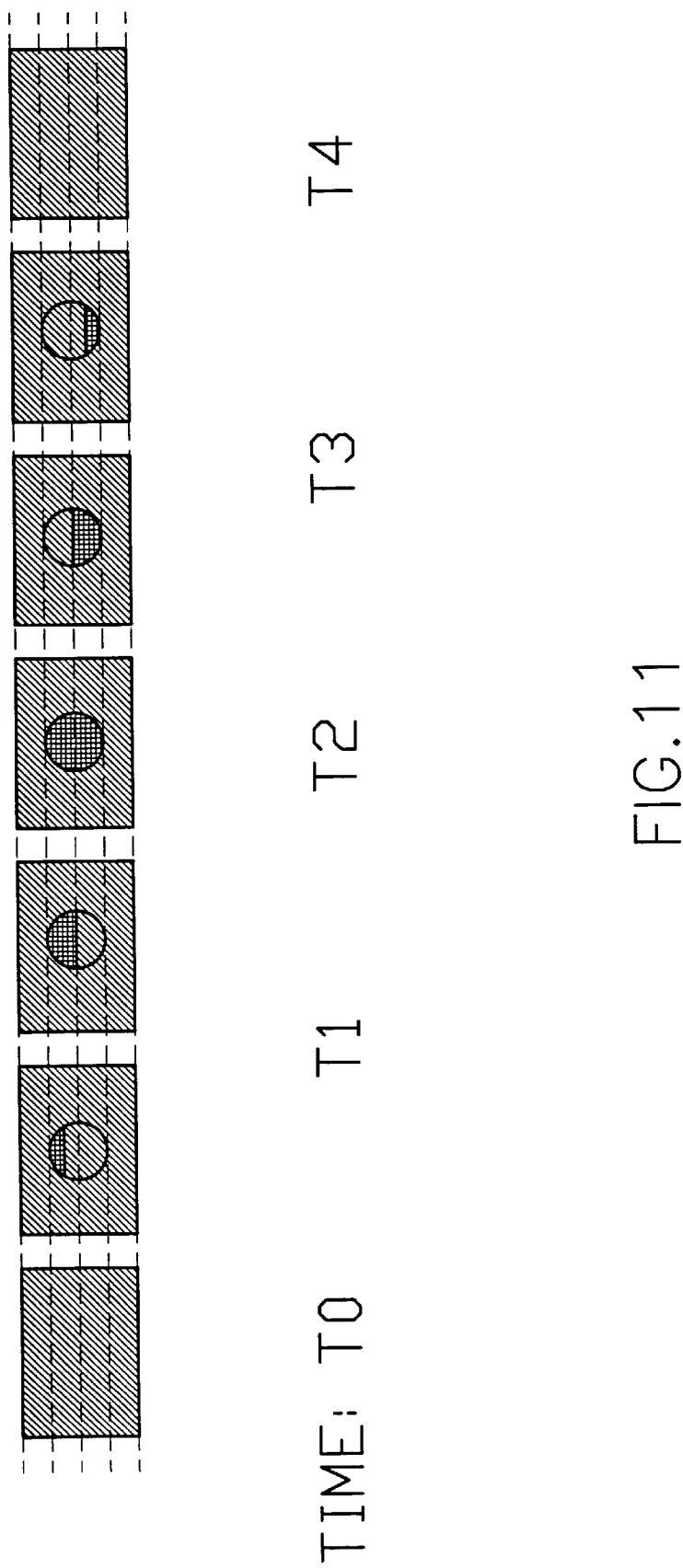
FIG. 11 illustrates one status of the projection of a light beam onto one light receiving face of the phototransistor of the optical encoder according to the present invention.
Figure 12:
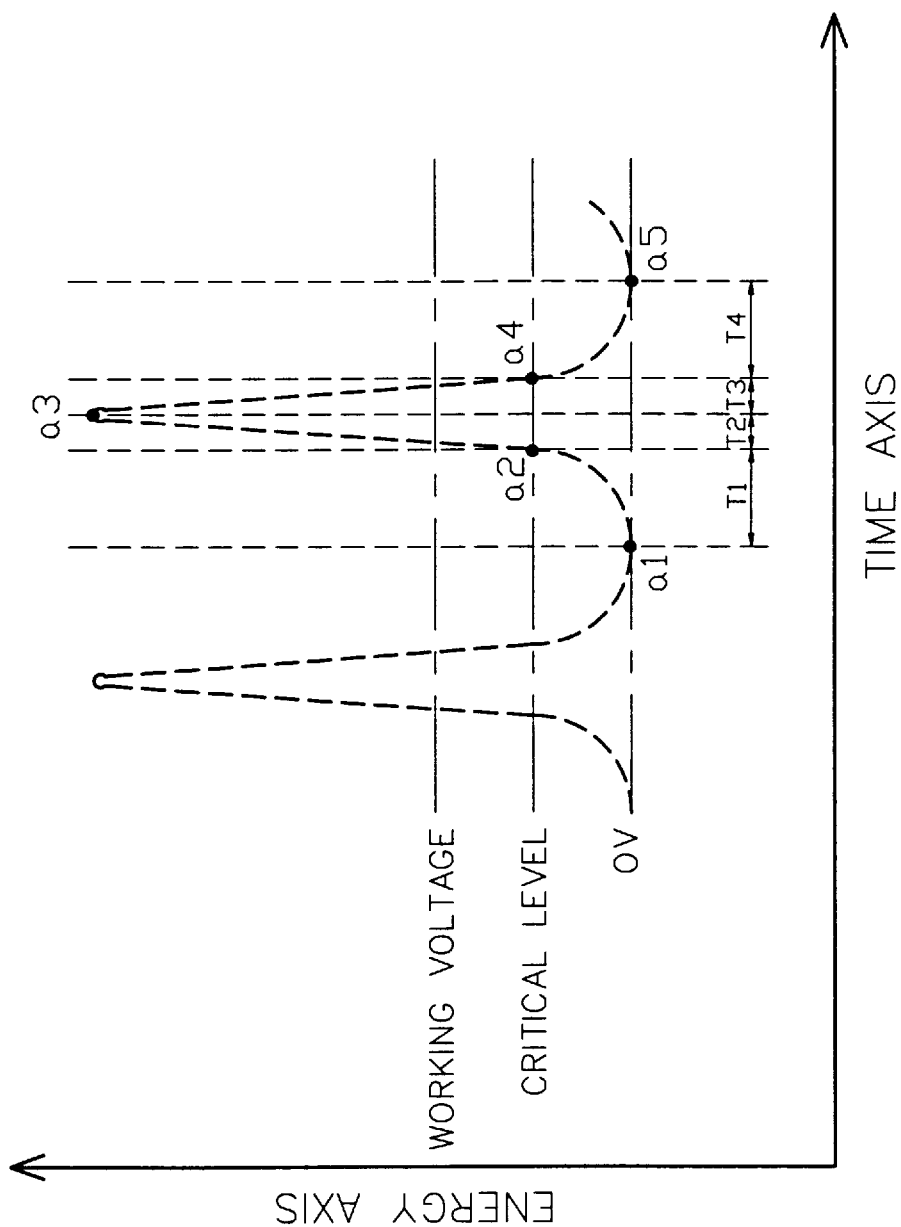
FIG. 12 is a waveform chart obtained from FIG. 11.

Referring to FIGS. 11 and 12, when at time T1, light beam energy is pulled rapidly from zero voltage a1 to point a2 (the critical level) and soon raised over the rated working voltage. When at time T2, light beam energy reaches to topmost point a3. When at time T3, light beam energy rapidly drops to point a4. When at time T4, light beam energy drops from point a4 to point a5, namely, the zero voltage level.

Figure 13:
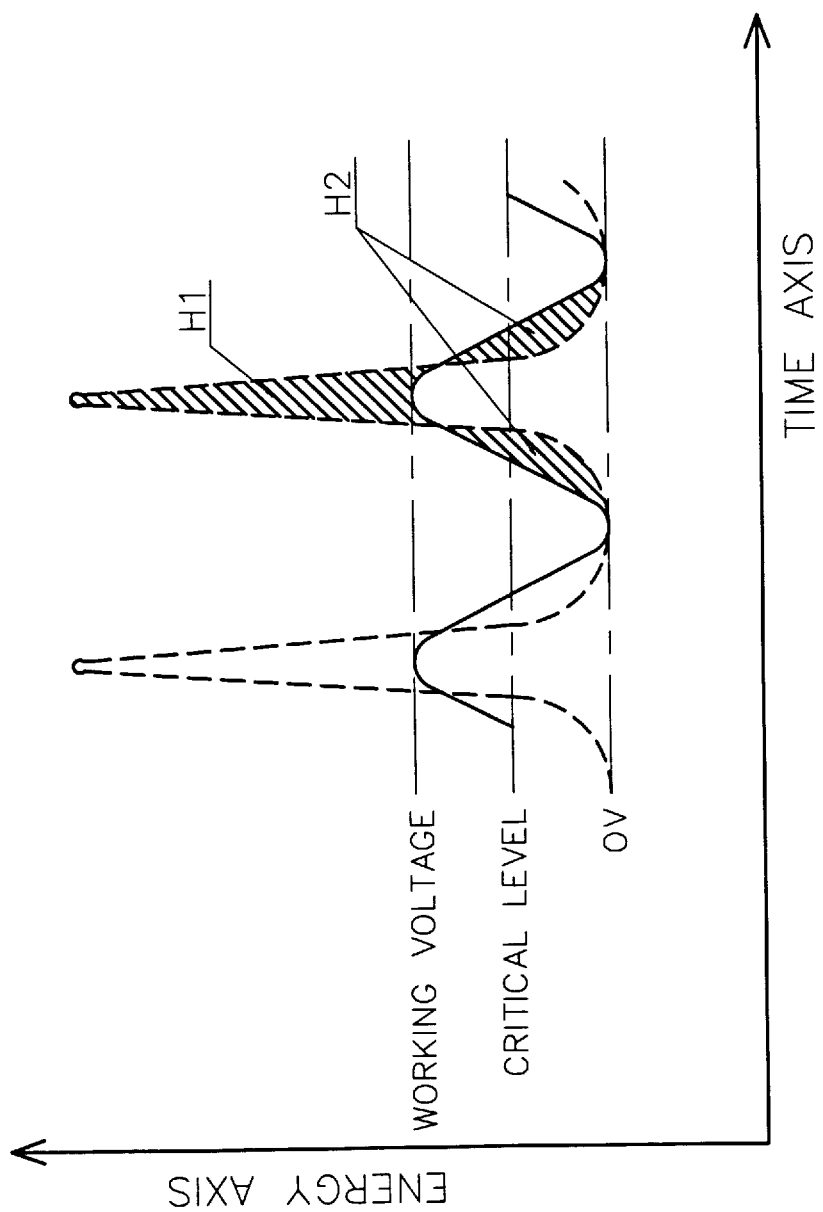
FIG. 13 is a waveform chart showing the difference between two waveforms obtained from an optical encoder with lenses and an optical encoder without lenses according to the present invention.
Figure 14:
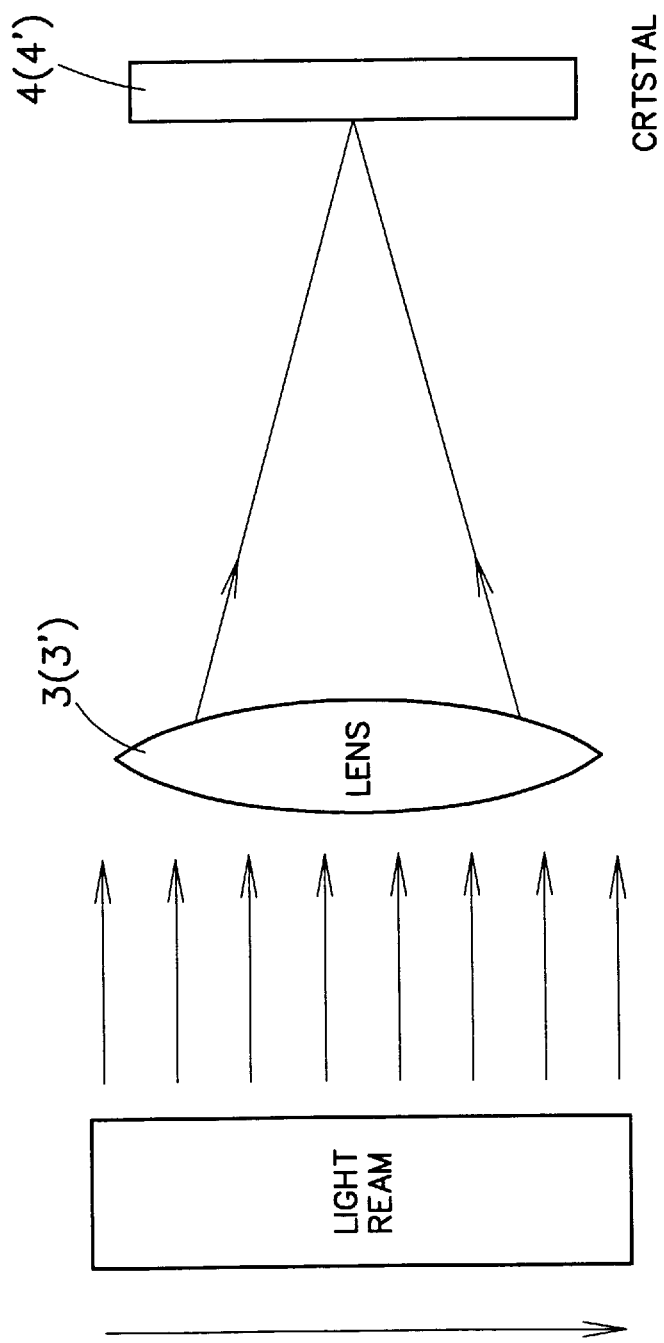
FIG. 14 is another schematic drawing showing the projection of light rays through a lens onto one crystal of the phototransistor of the optical encoder according to the present invention.
Figure 15:
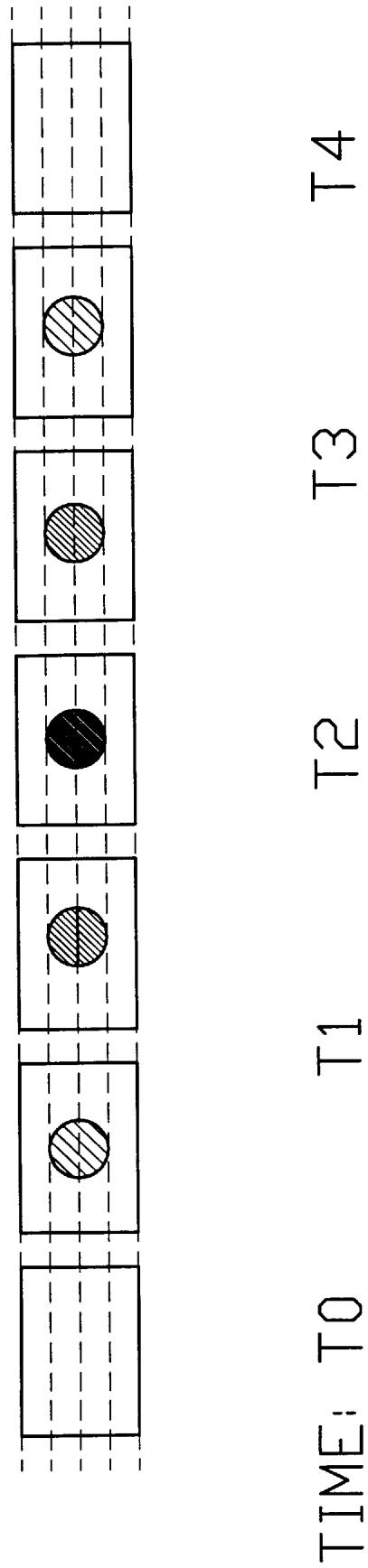
FIG. 15 illustrates another status of the projection of a light beam onto one light receiving face of the phototransistor of the optical encoder according to the present invention.
Figure 16:
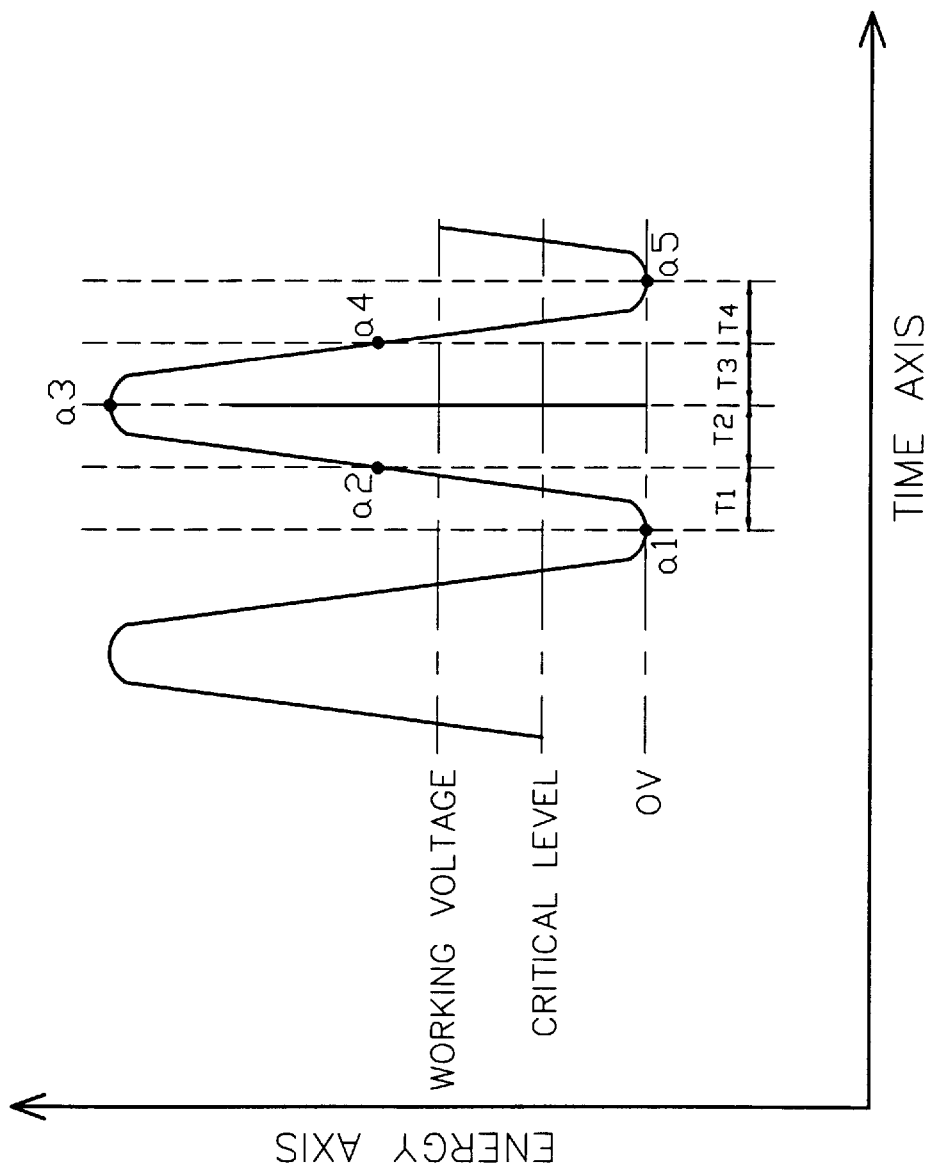
FIG. 16 is a waveform chart obtained from FIG. 15.

FIG. 13 is a waveform comparison chart showing the difference between a waveform H1 obtained from an optical encoder with lenses and a waveform H2 obtained from an optical encoder without lenses. As illustrated, when the light beam width C is smaller than the crystal width B, the potential of light beam can be rapidly pulled up, however the amount of light beam energy received by the crystal does not change, and the oblique line area at H1 is equal to the oblique line area at H2.

FIGS. from 14 to 16 show the variation of the projection of light beam onto the crystal when the light beam width C>crystal width B and focused onto the crystal within its width B. The variation is as follows:

1. Before moving to time T1, light beam energy is concentrated, and raised to a2 above the rated working voltage;
2. When at time T2, light beam energy reaches the topmost point a3;
3. When at time T3, light beam energy is maintained at a4 above the rated working voltage;
4. When moved to time T4, light beam energy rapidly drops below the critical level, and then drops to the zero voltage level at point a5 when reaches time T4.

Figure 17:
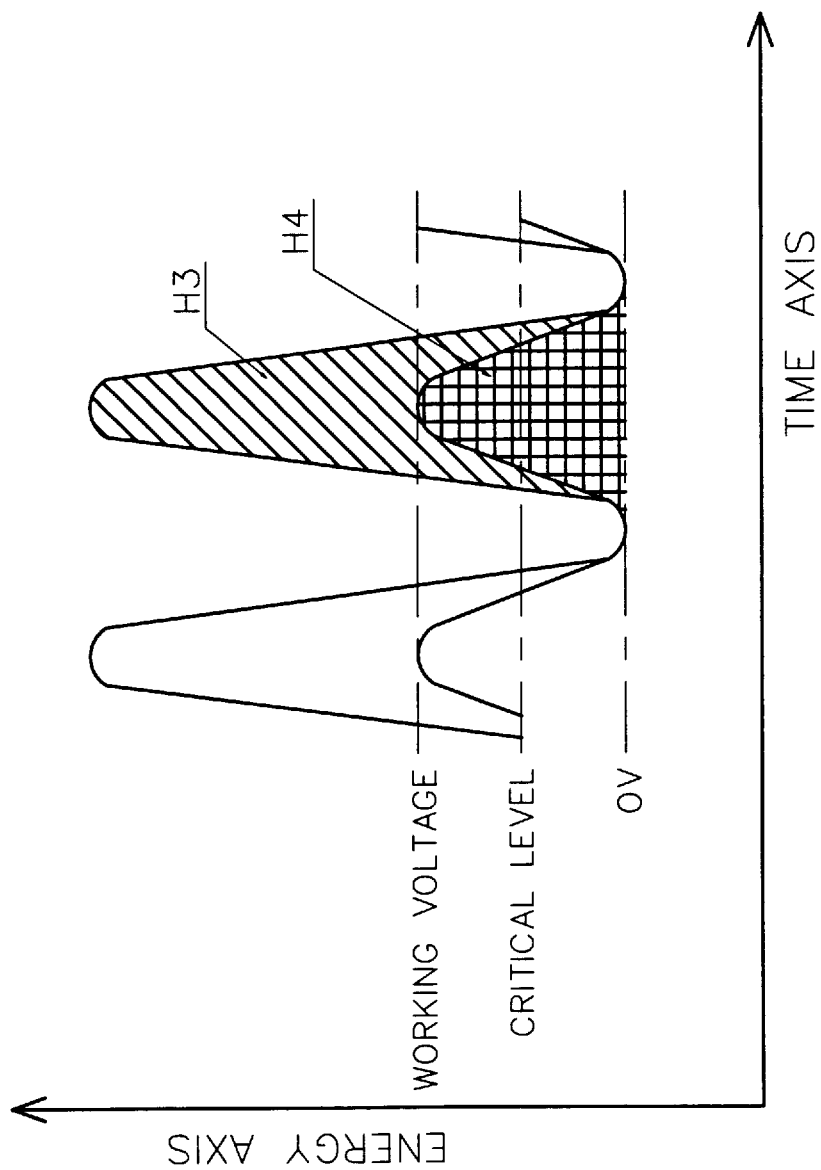
FIG. 17 is a waveform chart showing another two waveforms obtained from an optical encoder with lenses and an optical encoder without lenses according to the present invention.

FIG. 17 is a waveform chart showing another two waveforms obtained from an optical encoder with lenses and an optical encoder without lenses according to the present invention, in which the oblique line area at H3 is the sum of outputted light beam energy when lenses are installed; the oblique line area at H4 is the sum of outputted light bean energy when lenses are not installed. As indicated, when lenses are installed, light beam energy can be relatively increased.

Figure 18:
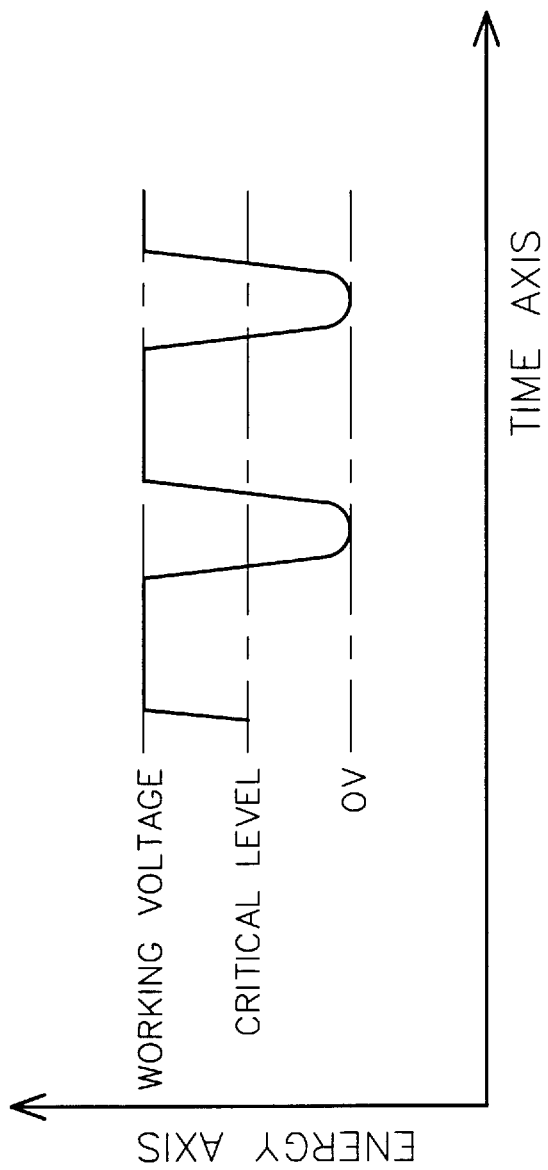
FIG. 18 is a waveform chart showing one waveform of the output signal of the optical encoder according to the present invention; and, FIG. 19 is a waveform chart showing another waveform of the output signal of the optical encoder according to the present invention.
Figure 19:
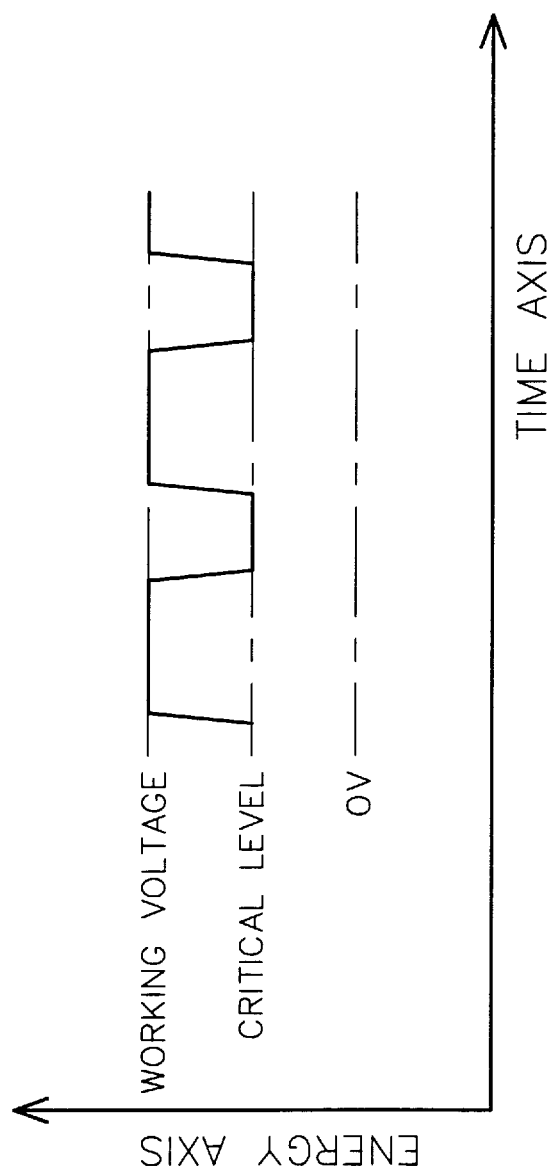

Referring to FIGS. 18 and 19, light beam energy above the working voltage and below the critical level are eliminated from judgement, and a signal approximately equal to a square wave is obtained for reading.

It is to be understood that the drawings are designed for purposes of illustration only, and are not intended for use as a definition or limits of the scope of the invention disclosed.

What the invention claimed is:

1. A method of reading an encoded optical signal and producing a substantially square wave signal therefrom, comprising:

(a) driving a light source to produce a light beam;
   (b) periodically intercepting said light beam to produce the encoded optical signal;
   (c) providing a phototransistor device having an optical receiving crystal impinged by the encoded optical signal and outputting an encoded electrical signal responsive to the encoded optical signal, said phototransistor device being supplied by a predetermined working voltage;
   (d) providing a lens to focus the encoded optical signal onto a receiving face of said optical receiving crystal, said lens being focused to increase a potential of said encoded electrical signal corresponding to a light level of the encoded optical signal, said potential being clamped at an upper level to said working voltage by said phototransistor device to substantially square off an upper level of said encoded electrical signal; and,
   (e) coupling said clamped encoded electrical signal to a circuit for reading said encoded electrical signal, said reading circuit disregarding a potential of said clamped encoded electrical signal which is below a predetermined critical level to obtain a substantially square wave signal.

2. An optical encoder for providing substantially square wave encoded electrical signals, comprising:

a light source producing a light beam;
   a wheel positioned to intercept said light beam to produce a pair of encoded optical signals, said wheel being rotated to encode said pair of encoded optical signals as periodic signals;
   a phototransistor device supplied with a working voltage and having a pair of optical receiving crystals to respectively output a pair of encoded electrical signals respectively corresponding to said pair of encoded optical signals, each of said receiving crystals clamping an upper voltage level of a respective one of said pair of encoded electrical signals to said working voltage;

a pair of lenses disposed between said wheel and said phototransistor, each of said pair of lenses focusing a respective one of said pair of encoded optical signals on a respective one of said optical receiving crystals to increase a potential of said clamped encoded electrical signal corresponding to a particular light level of said encoded optical signal; and, a judge circuit for reading said pair of clamped encoded electrical signals, said judge circuit including means for disregarding a voltage level of each of said clamped encoded electrical signals that is below a predetermined critical level to establish substantially square wave signals.

* * * * *